United States Patent [19]
Darmon et al.

[11] Patent Number: 5,313,473
[45] Date of Patent: May 17, 1994

[54] METHOD AND APPARATUS FOR DIGITAL DATA TRANSMISSION WITH AUTOMATIC REPEAT REQUEST

[75] Inventors: Marc Darmon, Paris; Marc Pontif, Villennes Sur Seine; Philippe Sadot, Paris, all of France

[73] Assignee: Alcatel Transmission Par Faisceaux Hertziens A.T.F.H., Lavallion Perret Cedex, France

[21] Appl. No.: 942,109

[22] Filed: Sep. 8, 1992

Related U.S. Application Data

[63] Continuation of Ser. No. 606,990, Oct. 30, 1990, abandoned.

[30] Foreign Application Priority Data

Nov. 28, 1989 [FR] France .................. 89 15630

[51] Int. Cl.⁵ .............................................. H04L 1/16
[52] U.S. Cl. ......................................... 371/35; 371/32
[58] Field of Search ................. 371/32, 33, 35; 370/82

[56] References Cited

U.S. PATENT DOCUMENTS 4,536,872 8/1985 Lahti .................................. 370/82
4,841,526 6/1989 Wilson et al. ........................ 371/32

OTHER PUBLICATIONS

Conard, J., "Character-Oriented Data Link Control Protocols", *IEEE Trans. on Communications*, vol. COM-28, No. 4, Apr. 1980, pp. 445-454.
Kahn, R., et al., "Advances in Packet Radio Technology", *Proc. IEEE*, vol. 66, No. 11, Nov. 1978, pp. 1468-1496.
Magill, J., et al., "Fast data-comm controller speaks to all protocols over two sets of channels", *Electronic Design*, Jan. 24, 1985, pp. 157-168.

*Primary Examiner*—Stephen M. Baker
*Attorney, Agent, or Firm*—Sughrue, Mion, Zinn, Macpeak & Seas

[57] ABSTRACT

Enough room is provided in a transmitted frame to receive a plurality (n) of useful information blocks, thereby making it possible to catch up any excessive lateness (r) which may arise due to successive repeats. The decoder (2) provides a confidence flag (3) to the controlling microprocessor (5). The command block (COM) from the decoder includes an indication of the number of useful blocks that are transmitted in the frame. This block is advantageously applied to an HDLC component (8).

7 Claims, 1 Drawing Sheet

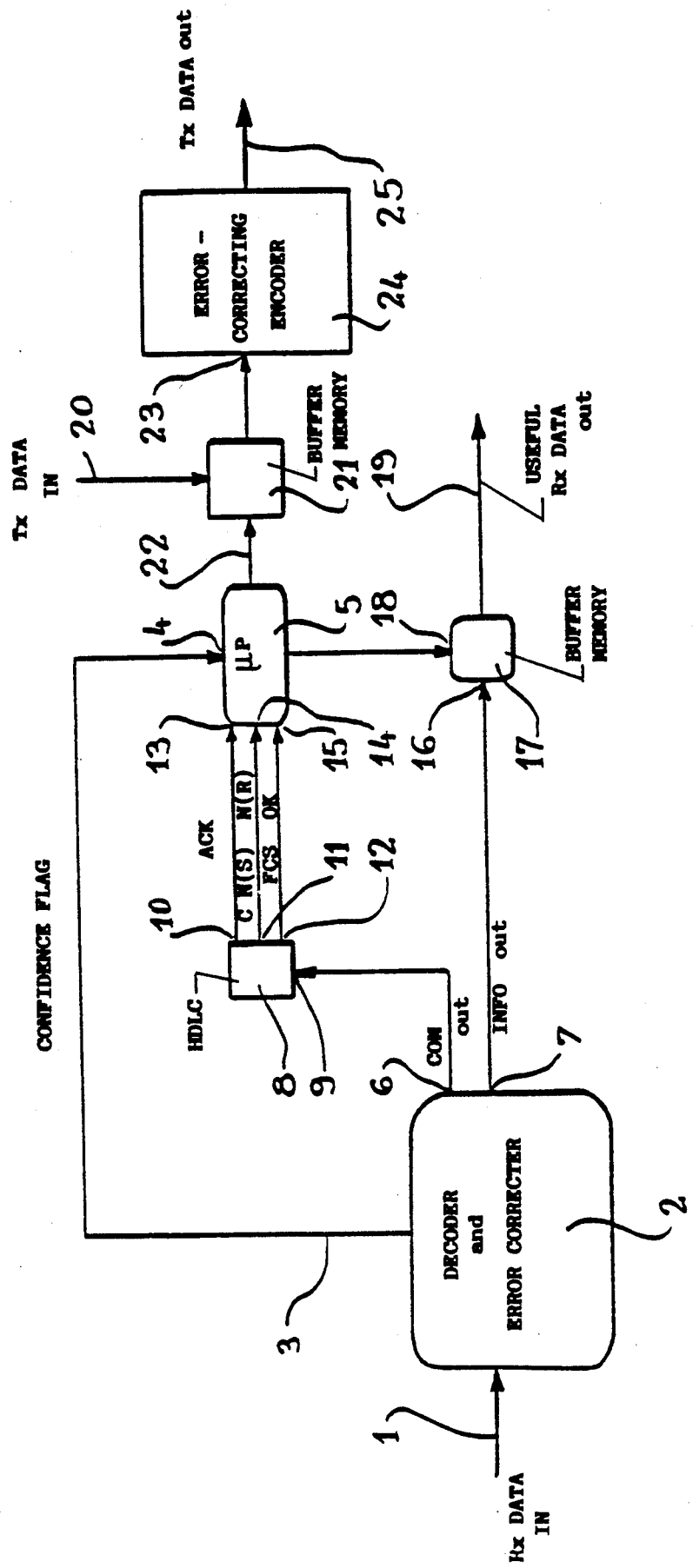

METHOD AND APPARATUS FOR DIGITAL DATA TRANSMISSION WITH AUTOMATIC REPEAT REQUEST

This is a continuation of application Ser. No. 07/606,990 filed Oct. 30, 1990, now abandoned.

TECHNICAL FIELD

The present invention relates to a method and apparatus for digital data transmission with automatic repeat request (ARQ) in the event of a message being badly received.

BACKGROUND OF THE INVENTION

Three strategies are in common use for reducing the error rate of a digital transmission.

The first consists in an error correcting code without a return path (sometimes called forward error control or FEC). A defect of this error correcting strategy is that it is poorly adaptable and this may be objectionable for certain types of channel (tropospheric channels, or channels being jammed). For example in a tropospheric channel, various channel parameters such as mean signal to noise ratio, coherence band, or coherence time, remain fixed on a small scale only. If these parameters are observed over several hours, several days, or several months, it can be seen that they are subject to non-negligible fluctuations. Thus, a code designed to operate ideally under given parameters will probably be ineffective at certain times of day or at certain times of the year. This strategy has the advantage of ensuring a transmission delay which is fixed. However it is ineffective against bursts of errors unless it is associated with interlacing which suffers from the drawback of increasing transmission delay.

A second strategy is the automatic repeat request (ARQ) strategy which requires the use of a return path, with this strategy being based on detecting errors and on requesting repeats when necessary. It may be defined as follows:

data is sent in packets, and not continuously;

each packet contains data symbols accompanied by check symbols; and the receiver makes use of the check symbols to detect whether an error has occurred in transmission. It then either accepts the block of data in the packet or it requests retransmission. Thus the ARQ strategy uses an error detecting code whereas the FEC strategy uses an error correcting code. An error detecting code is generally simpler to decode than is an error correcting code.

This strategy gives rise to additional redundancy constituted by retransmission. Thus although the redundancy specific to the coding scheme is fixed (and specified in terms of a code ratio), retransmission redundancy is a random variable. Total mean redundancy is specified in terms of an effective code ratio. The main drawback of this strategy arises when transmission conditions are bad (a very noisy channel) so that the error detecting code is quickly swamped and the number of repeats is very high, thereby increasing transmission delay. To mitigate this problem, it is present practice to associate ARQ strategy with an error correcting code, thereby providing the third strategy.

The third strategy is referred to as a "hybrid" strategy since it combines error correcting code and the ARQ procedure. The code used no longer serves merely to detect errors but also to correct them within the limit of the code's error-correcting capacity. The strategy is then as follows:

an encoded sequence is transmitted;

the receiver has a decoder which attempts to decode the sequence as received. A definite criterion is used for measuring the confidence that may be had in the decision of the decoder;

if the criterion is satisfied, then the decoded sequence is assumed to correspond to the sequence as transmitted, otherwise the receiver requests a repeat.

This hybrid ARQ strategy is described in various publications which make use either of block codes or of convolution codes decoded by the Viterbi algorithm. However, with such codes, it is not possible to obtain an arbitrarily small error rate while keeping the code ratio fixed. It is then possible to use a convolution code which is decoded by a sequential decoding algorithm. The best is doubtless the stack algorithm which, in addition, is capable of providing an indication concerning the reliability of decoding.

One of the drawbacks of strategies that automatically request repeats (the second and third above-mentioned strategies) is the ever increasing delay in data transmission due to successive repeats, thus requiring the transmitter to possess buffer memories of very large size, with data being lost if the memories overflow. This increasing delay means that these methods are unsuitable, in particular, for use in transmitting telephone calls.

SUMMARY OF THE INVENTION

The present seeks to remedy this drawback, and to this end it proposes a strategy which, while including an optionally hybrid ARQ strategy, makes it possible to have a transmission delay that does not increase indefinitely. The delay is "caught up" whenever transmission conditions become good enough.

This result is achieved by a method of transmitting digital data with automatic repeat requests, and with error detecting or correcting encoding being used on the transmitted blocks, and with a "confidence flag" being provided representative of the reliability of decoding, the method being consisting in providing an additional location in each frame to be transmitted, said additional location being large enough for it to be possible, in the event of delay reaching a predetermined value judged to be excessive and due to repeat transmissions, to absorb this excessive delay by transmitting a plurality of information blocks simultaneously in a single frame instead of transmitting only one at a time as when the delay is not excessive, such a frame comprising a plurality of information blocks thus comprising, prior to encoding, at least:

a conventional frame locking word MVT a command block which includes the information required by the repeat transmission protocol, which information includes a mention of the number of useful information blocks being transmitted simultaneously in the frame, namely a single block when the delay is zero or not excessive, and two or more blocks when the delay is judged to be excessive; and an information block which includes, inter alia. useful information bits per se, with the size of the information block being sufficient, in the event of a delay judged to be excessive, to contain two or more successive blocks of useful information, each of which would otherwise have been transmitted in a respective frame.

In any event, the invention will be well understood and its advantages and other characteristics appear more clearly on reading the following description of a non-limiting embodiment, given with reference to the sole figure of the accompanying drawing which is a block of one possible apparatus for implementing the method.

BRIEF DESCRIPTION OF THE DRAWING

This sole figure relates to equipment for digital signal processing and fitted in a transmitter/receiver of a duplex telephone installation.

DETAILED DESCRIPTION

In the figure, reference 1 designates an inlet wire on which a digital data train is received from the other party, e.g. via a microwave link. The digital data train is encoded using an error-correcting code, and it is therefore applied to a decoder and error-correcting circuit 2. In this preferred example, a convolution code is used e.g. having a code ratio of ½ and a constraint length of 35, together with sequential decoding using the stack algorithm. The decoder 2 is thus a sequential decoder having the known advantage of being easily able to provide a decoding reliability signal or "confidence flag" on one of its outputs 3, with such a signal being essential for implementing the present invention. This signal is constituted in this case by a flag indicating whether the stack has overflowed or not. Depending on the value of this confidence flag, either decoding is judged to be effective in which case there is no need to request a repeat, or else the decoding is judged to be ineffective and it becomes necessary to request a repeat.

Each frame received at 1 is thus an encoded frame, with the encoding being performed in an installation similar to that shown in the figure but located with the other party from whom data is received at 1. Prior to encoding, the frame is made up as follows:

| MVT | COM | INFO |
|-----|-----|------|

It thus comprises:

an entirely conventional frame lock word MVT for use in synchronizing packets, with this frame lock word not being encoded by the sequential encoder;

a command block COM described in greater detail below and including all of the information required by the automatic repeat request protocol, and in particular: a positive or negative acknowledgement, the number of the first (or only) block transmitted in the frame, the number of blocks transmitted in the frame, and the number of the expected block (or the number of the block whose repeat is being requested); and a block INFO of information per se.

In accordance with the essential characteristic of the invention, the number of useful bits in this block INFO depends on the lateness which the transmitter has accumulated by virtue of the number of successive repeats.

By way of numerical example for obtaining a clear idea, the block COM contains 48 bits and the block INFO 512 bits. Since these two blocks are encoded using a convolution code having a ratio of ½ and a constraint length of 35, they become, after encoding, a set of:

2. (48+512+35)=1190 bits

More precisely, the structure of the block COM prior to encoding is as follows:

| FLAGS | ACK | C | N(S) | N(R) | FCS |
|-------|-----|---|------|------|-----|

The block COM thus comprises:

an (optional) synchronization sequence labelled FLAGS which is a kind of frame locking word for a COM block. FLAGS may be constituted, for example, by the following 8 bits:

0 1 1 1 1 1 1 0 a single bit ACK which is used to acknowledge reception of the last block received. This block is assumed to have been properly received if the decoding of the assembly COM+INFO in the last block was judged to be reliable (in the encoding example used herein, if the stack did not overflow), and most preferentially, if the block COM of said block can additionally be considered as having been correctly received on its own.

For example, if ACK is 1, that means that the last block received was received correctly, and that it was indeed the block expected by the other party. The block which is now expected is therefore N(R). That means that all blocks earlier than N(R) have been correctly received by said other party, because the strategy used herein is advantageously the conventional "Go-Back-N ARQ" strategy (in which packets of symbols are transmitted on a continuous basis with replies from the receiver arriving after a certain time interval equal to the time taken by the transmitter to send $N-1$ other packets: if a repeat request corresponding to an error in a packet is received by the transmitter, then the transmitter repeats the erroneous packet and all following packets).

If ACK is 0, then reception has been bad or decoding has been bad, and in any event a repeat is requested of all blocks starting from N(R).

One or more bits C (a single such bit in this example) indicating how many bits of the frame block INFO should be considered as being useful data bits: in our example 256 (no excessive delay, and therefore only one block of useful information in the frame) or 512 (excessive delay, therefore two blocks of useful information in the frame). For example, the transmitter of said other party may judge that delay is excessive (i.e. that it is too late) when the number N(S) of the block it is transmitting in the present frame is at least $r=4$ lower than the number of the block it would have been transmitting had there not been any repeat requests (where, in more general terms, r is an arbitrary integer). I.e. "too late" means at least r blocks behind schedule. If C is 0, then the transmitter is not too late and the data rate is normal: in the present example 256 useful bits and 256 padding bits. If C is 1, then the transmitter is too late (r greater than or equal to 4) and, in order to catch up it is transmitting useful bits at a rate of 512 useful bits per block INFO: the bit C therefore serves to tell the receiver whether it needs to take account of all 512 bits in the block INFO, instead of only the first 256 bits;

the following 11 (for example) bits N(S) indicate the number (modulo 2048) of the first (or only) block of useful information in the transmitted frame;

the following 11 (for example) bits N(R) indicate the number (modulo 2048) of the block of useful information expected by the other party: in other words it is either the number of the first block to be repeated (if ACK equals 0) or else the number of the first block to be transmitted normally (if ACK equals 1); and the following 16 (for example) bits FCS which are not essential but which are highly recommended are redundancy bits constituting an error detecting code for the block COM itself (or even more advantageously a code which is both error detecting and error correcting).

The above-mentioned 1190-bit blocks which constitute the code bits between MVTs are thus applied to the sequential decoder 2 via its input 1. The confidence flag it delivers at its output S is applied at 4 to a controlling microprocessor 5, while decode outputs 6 and 7 from the decoder 2 deliver respectively the 48 bits of the decoded block COM and the 512 bits of the decoded block INFO.

A cheap and very practical interface component is known as an "HDLC" component. This is an electronic component that is widely available on the market and which serves, when a digital data train is applied in a certain special format on its sole input to deliver directly on each of its multiple outputs various components of said frame, including in particular a reliability flag.

The block format of an HDLC frame is recalled below:

| FLAGS | ADDRESS | CONTROL | INFO-COM | FCS |

In HDLC protocol, the FLAGS field (8 bits) constitutes a frame locking word for the HDLC frame. The ADDRESS field (8 bits) serves to indicate the destination of the information in the INFO-COM field (8 bits). The CONTROL field (8 bits) is used for controlling the HDLC frame. The FCS word (16 bits) is the error detecting (or correcting) code word.

In order to make it possible to use an HDLC component 8, which is so convenient and cheap, the 24 bits of the ADDRESS, CONTROL, and INFO-COM fields in a conventional HDLC frame are used as follows in the above-mentioned block COM which is output on 6:

ACK is the first bit of the ADDRESS field;

C is the second bit of the ADDRESS field;

N(S) is constituted by the last six bits of the ADDRESS field followed by the first five bits of the CONTROL field; and N(R) is constituted by the last three bits of the CONTROL field followed by the 8 bits of the INFO-COM field.

If C occupies more than 1 bit, then N(S) and N(R) should occupy a correspondingly smaller number of bits.

Thus, the 48 bits of the block COM output at 6 are applied to input 9 of an HDLC interface package 8, which has three outputs 10, 11, and 12 on which it applies, respectively:

the word ACK on 10;

the set C, N(S), N(R) on 11; and a flag bit "FCS OK" on 12, indicating that the block COM is accepted.

So far as the HDCL package 8 is concerned, it continuously receives HDCL frames constituted by a succession of blocks COM each beginning with FLAGS constituting its own frame locking word.

This control information delivered on outputs 10, 11, and 12 of the HDLC component 8 is applied to respective inputs 13, 14, and 15 of the microprocessor 5 which makes use of them in accordance with a "Go-Back-N ARQ" protocol which may be a highly conventional ARQ protocol adapted to the double data rate option of the present invention, but which in the present example also has additional advantageous features as explained below.

512-bit long blocks INFO output at 7 from the decoder 2 are applied to a buffer memory 17 via an input 16, which memory has an input 18 that receives a signal from the controlling microprocessor 5 for extracting useful 256-bit blocks which are output at 19 and which constitute the received data.

The microprocessor 5 generates a control signal on 18 only when it receives a positive confidence flag signal on 4 relating to the sequential decoding and if it receives an FCS OK signal on 15 indicating that the block COM has been received correctly. This control signal is used to extract the genuinely useful information blocks from the memory 17 while omitting any possible padding bits.

Since the connection is a duplex connection, i.e. a two-way connection, the data train to be transmitted by the party in question arrives via an input 20 to be stored in a buffer memory 21. As a function of the information contained in the block COM as received from the other party, the microprocessor 5 locates the data that is to be transmitted (or retransmitted) from said memory 21 via a connection 22, and it naturally adds a new block COM thereto as generated in accordance with its ARQ protocol, and which is intended for the other party.

The corresponding frames are then applied at 23 to the error correcting encoder 24 of the installation shown in the figure which encodes the blocks COM and their blocks INFO in conventional manner, and the digital data for transmission is output at 25 together with the corresponding MVT words for application to the radio transmitter proper.

The "Go-Back-N ARQ" protocol used herein naturally takes account of the possibility mentioned above of double rate transmission (or triple rate, quadruple rate, ..., if C is encoded on 2 or even more bits). Advantageously, it is based on the three following fundamental rules:

1) if the decoding is judged to be unreliable and/or if the control block contains one or more errors, then a repeat is requested;

2) when the transmitter is too far behind (r greater than or equal to a given value), it transmits useful data bits over the entire capacity of the block INFO, i.e. n useful blocks per block INFO (in the present example it transmits 512 useful bits, i.e. 2 useful blocks), and it consequently increments the number N(S) of the first block transmitted on the next occasion by n (i.e. 2 in this example); and 3) when the receiver receives a repeat request it ignores the request if the requested block has been sent within the last N turns (or within the last N/n turns if transmission has been taking place at n useful blocks per block INFO). Should the receiver make several successive requests (up to N requests) for the same block, only the first repeat request is taken into account. The purpose of this rule is to avoid repeating a block before being sure that the receiver did indeed receive said block badly on the most recent occasion it was transmitted.

The invention makes it possible to have an arbitrarily small binary error rate TEB on the two paths of a duplex call, providing that the quality of the connection (e.g. as measured by the mean signal to noise ratio) is greater than a given critical quality. This critical quality is always much better than the quality required by other conventional systems for the same performance. The size of the above-mentioned blocks INFO is fixed as a function of user requirements.

In practice, the buffer memory 21 of the transmitter is finite in size and precautions must be taken concerning the possibility of it becoming saturated. The buffer memory at the transmitter is used for storing the blocks that it has been given most recently for transmission purposes, and it may receive a request to repeat a block that was given to it some considerable time previously.

With the numerical values given by way of example, the blocks are numbered modulo 2048. The blocks contain 256 useful bits, and this corresponds to two blocks having the same number once every 500 ms assuming that the data rate is 1 Mbit/s (where 500 ms is the order of magnitude of the largest transmission delay that can be tolerated in telephony).

Assume that the transmitter has enough memory for storing 2048 blocks. These are the 2048 blocks most recently received by the transmitter. As a result all of the blocks in the buffer memory of the transmitter have different numbers modulo 2048. It will be understood that if transmission delay exceeds 2048 blocks then the oldest blocks will be lost and overwritten by blocks that have arrived more recently.

In order to prevent blocks accumulating in the buffer memories of the transmitters due to repeat transmissions, blocks are transmitted in pairs whenever the transmitter is late relative to transmission over a noiseless channel. Whenever the transmitter is not late (either because it has caught up or because repeat transmissions have not been requested) then blocks must be transmitted at half the maximum data rate. For example, it may be assumed that 256-bit blocks are transmitted together with 256 padding bits when the transmitter is not late, whereas two blocks of 256 useful bits are transmitted when the transmitter is late. However, the 256 padding bits can be used for conveying information, for example by encoding 256 useful bits on 512 bits. This can be used to reduce the number of cases in which the decoding of the set of blocks COM and INFO is judged to be unreliable, since the 256 padding bits can be replaced by 256 error correcting code bits.

When used with a very long constraint length convolution code having a ratio of ½ and a sequential decoder with flexible decision making, this system makes very high quality transmission possible (binary error rate $<10^{<10}$) over a troposopheric channel having a mean signal to noise ratio of 3 dB with diversity 2 and of 1 dB with diversity 3. Under such circumstances, the transmission delay never exceeds 400 ms for a data rate of 1 Mbit/s.

In general, transmission quality (whether or not measured in terms of binary error rate) may be selected arbitrarily by selecting an appropriate encoding rate and constraint length for the convolution code used.

Naturally the invention is not limited to the embodiment described above, and on the contrary it may be implemented in numerous other ways. Thus, for example, it may be used with a one-way link and not on a duplex link. Under such circumstances, the frame normally transmitted by the transmitter to the receiver does not include the word N(R) nor the word ACK, and the frame returned from the receiver to the transmitter does not include the word N(S), unless said word is advantageously replaced by an error correcting code (which may then be of very high performance) for said retransmitted frame. It is not essential to use an HDLC component, since the microprocessor 5 could process the block COM output at 6 directly. Sequential coding using a stack algorithm is not essential either, and any other type of coding could be used, even non-convolution coding, providing that whatever the means used for this purpose, it is possible to obtain information concerning the reliability of decoding, i.e. the "confidence flag", and this is not difficult, in general, for the person skilled in the art.

We claim:

1. A method of transmitting digital data with automatic repeat requests (ARQ), and with error detecting or correcting encoding being used on the transmitted blocks, and with a "confidence flag" (3) being provided representative of the reliability of decoding, the method being characterized in that it consists in providing an additional location in each frame to be transmitted, said additional location being large enough for it to be possible, in the event of delay reaching a predetermined value (r) judged to be excessive and due to repeat transmissions, to absorb this excessive delay by transmitting a plurality (n) of information blocks simultaneously in a single frame instead of transmitting only one at a time as when the delay is not excessive, such a frame comprising a plurality of information blocks thus comprising, prior to encoding, at least:

a conventional frame locking word (MVT);

a command block (COM) which includes the information required by the repeat transmission protocol, which information includes a mention (C) of the number (n) of useful information blocks being transmitted simultaneously in the frame, namely a single block when the delay (r) is zero or not excessive, and two or more blocks (n) when the delay (r) is judged to be excessive; and an information block (INFO) which includes, inter alia, useful information bits per se, with the size of the information block being sufficient, in the event of a delay (r) judged to be excessive, to contain two or more (n) successive blocks of useful information, each of which would otherwise have been transmitted in a respective frame.

2. An ARQ method according to claim 1, characterized in that the command block (COM) itself includes error detecting or correcting encoding (FCS) suitable for providing an indication (12) on reception concerning the validity of the command block (COM).

3. A method according to claim 1, characterized in that it further consists, when there is no lateness to be caught up and so only one block of useful information is to be transmitted per frame, in filling the remaining portion of the information block (INFO) not with padding bits but with error correcting code bits.

4. An ARQ method according to claim 1, characterized in that in order to make use of an HDLC component (8) at the receiver, the 24 bits of the ADDRESS, CONTROL, and INFO-COM fields of a conventional HDLC frame are made use of as follows for the command block (COM) of the transmitted frame;

the first bit of the ADDRESS field is the acknowledge bit (ACK) for the last received block of useful information; and the remaining bits of the ADDRESS field and the bits of the CONTROL and INFO-COM fields are used for indicating how many (C) useful information blocks are actually transmitted in the frame, the number (N(S)) of the first (or only) useful information block transmitted in the frame, and the number (N(R)) of the useful information block expected from the other party, where said numbers (N(S), N(R)) are optional.

5. An ARQ method according to claim 1, characterized in that it uses a Go-Back-N ARQ type protocol in which packets of symbols are transmitted continuously but replies from the receiver arrive after a certain time interval equal to the time in which the transmitter sends N-1 other packets, which protocol is established using the following three rules:

1) if the decoding is judged to be unreliable and/or if the command block (COM) contains one or more errors, then a repeat is requested;

2) when the lateness (r) of the transmitter is excessive, the transmitter transmits useful information bits over the entire capacity of the information block (INFO), i.e. n useful blocks per information block, and the number (N(S)) of the first block transmitted on the next occasion is consequently incremented by n; and 3) when the receiver receives a repeat request, it ignores it if the requested block has been transmitted within the last n turns (or within the N/n last turns if transmission is taking place at n useful blocks per information block); when the receiver requests the same block on a plurality of successive occasions, up to a total of N successive occasions, only the first request is taken into account.

6. An ARQ method according to claim 1, characterized in that the coding used for the frame as transmitted is a convolution code having a code ratio and a constraint length which are selected a function of the quality (TEB) of the intended link.

7. An ARQ method according to claim 6, characterized in that the decoding is sequential decoding using the stack algorithm.

* * * * *